(12) United States Patent
Mayni et al.

(10) Patent No.: US 8,267,134 B2
(45) Date of Patent: Sep. 18, 2012

(54) METHOD FOR IMPROVED RETREAD ENDURANCE

(75) Inventors: Paul A. Mayni, Greenville, SC (US); Nathan J. Panning, Simpsonville, SC (US); Juan-Pablo Gallego, Samutprakarn (TH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 659 days.

(21) Appl. No.: 12/440,936

(22) PCT Filed: Oct. 31, 2006

(86) PCT No.: PCT/US2006/042401
§ 371 (c)(1),
(2), (4) Date: Mar. 12, 2009

(87) PCT Pub. No.: WO2008/054387
PCT Pub. Date: May 8, 2008

(65) Prior Publication Data
US 2009/0205762 A1    Aug. 20, 2009

(51) Int. Cl.
*B60C 11/02* (2006.01)
*B32B 37/26* (2006.01)
*B29D 30/54* (2006.01)

(52) U.S. Cl. ............ 152/209.6; 152/209.18; 152/188; 156/96; 264/36.14; 264/326; 264/DIG. 74

(58) Field of Classification Search ............. 152/209.1, 152/209.6, 209.18, 154.2, 187, 188; 156/95, 156/96, 110.1, 909, 928; 264/36.14, 501, 264/326, 328.3, DIG. 74; 425/17, 46
See application file for complete search history.

(56) References Cited

U.S. PATENT DOCUMENTS

| 650,907 A | * | 6/1900 | Pope | 152/187 |
| 1,202,968 A | * | 10/1916 | Cole | 152/187 |
| 3,027,926 A | * | 4/1962 | Speer | 152/187 |

(Continued)

FOREIGN PATENT DOCUMENTS

AU    236346 A    6/1959

(Continued)

OTHER PUBLICATIONS

International Search Report and Written Opinion for PCT/US06/42401, dated Feb. 27, 2007.

(Continued)

*Primary Examiner* — Eric Hug
(74) *Attorney, Agent, or Firm* — Hahn Loeser & Parks LLP; Bret A. Hrivnak, Esq.

(57) ABSTRACT

The present invention relates to a method of retreading a tire and a retread tire (10) made by this method. The method comprises the steps of providing a tread layer (40) having a tread side (44) and a sole side (46) wherein the surface of the sole side (46) includes a plurality of tread elements (48) such as sipes and/or grooves or other void. Each tread element (48) has a first edge (64) and a second edge (66) at the surface of the sole side (46) of the tread layer (40). At least one of the first edge (64) and second edge (66) is formed to have a break edge (84) such as a rounded edge or a chamfered edge of 0.4 mm or more. The break edge (84) removes the sharp corner and provides increased endurance for the retreaded tire (10).

21 Claims, 6 Drawing Sheets

U.S. PATENT DOCUMENTS

| | | | |
|---|---|---|---|
| 4,934,426 A | 6/1990 | Remond et al. | |
| 5,275,218 A | 1/1994 | Nakayama et al. | |
| 5,536,348 A | 7/1996 | Chlebina et al. | |
| 5,603,366 A | 2/1997 | Nakayama et al. | |
| 6,554,034 B1 | 4/2003 | Minami | |
| 2004/0256041 A1 | 12/2004 | Ratliff, Jr. | |
| 2005/0150582 A1 | 7/2005 | Matsumura | |

FOREIGN PATENT DOCUMENTS

| | | |
|---|---|---|
| EP | 1 508 457 A1 | 2/2005 |
| FR | 2 573 001 A2 | 5/1986 |
| GB | 15401 | 0/1907 |
| JP | 64-022601 | 1/1989 |
| JP | 05-155202 A | 6/1993 |
| JP | 6 286419 A | 10/1994 |
| JP | 2003-154527 | 5/2003 |

OTHER PUBLICATIONS

Abstract of FR 2 573 001 (A2) printed from http://worldwide.espacenet.com on Jul. 13, 2011, 1 pg.

Abstract of JP 6 286419 (A) printed from http://worldwide.espacenet.com on Jul. 13, 2011, 1 pg.

* cited by examiner

METHOD FOR IMPROVED RETREAD ENDURANCE

BACKGROUND OF THE INVENTION

1. Field of the Invention

The present invention is in the field of re-treaded tires.

2. Description of the Related Art

When tires become worn, they can be restored with new tread. Large truck tires are typically retreaded as part of a routine tire-management program. The carcass of a truck tire is expected to last several hundred thousand miles and be amenable to having a new tread adhered to it several times. New truck tires are quite expensive and are therefore bought with the expectation that their high initial costs are offset by the long service life of the carcass and the low comparative cost of retreading.

A variety of procedures and different types of equipment are available for use in recapping or retreading pneumatic tires. One of the first steps in retreading a worn tire is to remove existing tread material from the tire carcass by a sanding procedure known as buffing. Next a layer of what is known as "cushion gum" is applied to the carcass. This layer of extruded, uncured rubber may be stitched or adhesively bonded to the carcass. Next, a tread layer is applied atop the layer of cushion gum. In the cold recapping process, the tread layer is cured rubber, and has a tread pattern already impressed in its outer surface. The tire is then placed in an autoclave, and heated under pressure for an appropriate time to induce curing of the gum layer, and binding of the gum layer to the inner or sole side of the tread layer and the carcass. The term "cure" refers to the formation of cross-links between the elastomer molecules in the rubber compound. It is further noted that there are various methods of bonding the tread layer to the carcass such as the use of adhesives, bonding agents, cushion gums, etc., and that all of the methods known in the art are included when referring to the term "bonding interface".

A common problem with tires, including retreads, is that as the tire wears, the traction-providing elements also wear, until eventually the elements are substantially worn away. The result can be a significant reduction in traction for the worn tire. Efforts have been made to develop a tread layer that has tread elements cut into the sole side (the side opposite the tread side) of the tread layer. The term "tread elements" refers to sipes, lateral grooves, and/or longitudinal grooves or any other void formed in the tread. The tread elements molded into the sole side of the tread layer appear as the tire wears, giving improved worn traction over the life of the retread and allowing the tire to be removed from service later in life. One problem identified in these earlier efforts is that a stress riser is created at the sharp edge of the interface of the tread elements/bonding interface that provides a crack initiation point allowing the tread to peel away from the tire carcass.

SUMMARY OF THE INVENTION

A particular embodiment of the present invention includes a tread for a retread tire comprising: a tread body having a tread side and a sole side; and a plurality of tread elements formed in the sole side of the tread body and having at least a first edge and a second edge on opposing sides of each tread element of the plurality of tread elements at the interface of the tread element and the surface of the sole side of the tread; wherein at least one of the first edge and the second edge is a break edge of at least 0.4 mm.

Another particular embodiment of the present invention includes a mold for a tread comprising: a tread impression side for forming the tread pattern; a sole side for forming the sole side of the tread, wherein the sole side includes a plurality of projections extending from the surface of the sole side; wherein a radius or a chamfer is formed at the interface of the sole side and each of the plurality of projections.

Another particular embodiment of the present invention includes a retread tire comprising: a tire carcass; a tread layer having a tread side and a sole side, a plurality of tread elements formed in the sole side of the tread body and having at least a first edge and a second edge on opposing sides of each tread element of the plurality of tread elements at the interface of the tread element and the surface of the sole side of the tread; wherein at least one of the first edge and the second edge is a break edge of at least 0.4 mm; a bonding interface bonding the sole side surface of the tread to the tire carcass.

Another particular embodiment of the present invention includes a method of retreading a tire comprising the steps of: providing a tread layer having a tread side and a sole side, wherein the surface of the sole side includes a plurality of tread elements, each of the plurality of tread elements having a first edge and a second edge at the interface of the tread element and the surface of the sole side of the tread layer; and forming at least one of the first and second edges of each tread element to have a break edge of 0.4 mm or more.

These and other advantages will be apparent upon a review of the detailed description of the invention.

DETAILED DESCRIPTION OF THE DRAWINGS

Figure 1:
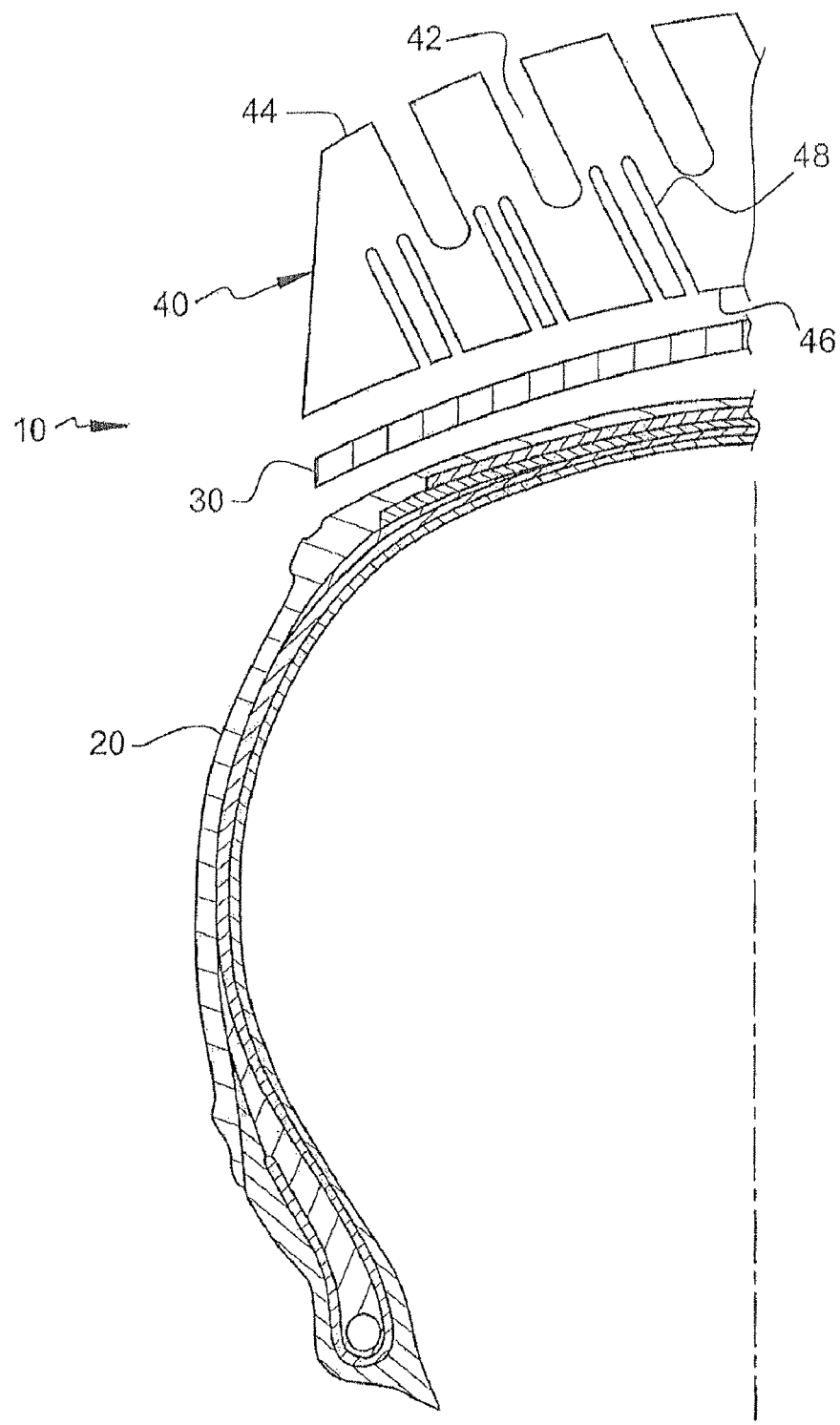
FIG. 1 shows a partial cross-sectional view of a retread tire having tread elements formed in the sole side of the tread layer in accordance with one embodiment of the invention.

Referring now to FIG. 1, a partially exploded axial section of a retread tire 10 is shown comprising a tire carcass 20, a cushion layer 30, and a tread layer 40 in accordance with a first embodiment of the invention. The tread layer 40 comprises a band of cured rubber having a tread pattern 42 formed in its outer surface 44. A plurality of tread elements 48 are also shown formed in the inner surface 46, or sole side surface, of the tread layer 40. The cushion layer 30 is positioned between the ready-to-retread tire carcass 20 and the tread layer 40. Once these elements are assembled under normal retread procedures, the tire 10 is then placed in an autoclave, and heated under pressure for an appropriate time to induce curing of the cushion layer 30, and binding of the cushion layer 30 to the sole side surface 46 of the tread layer 40 and the tire carcass 20. It is noted that, in the examples described herein, a cushion layer 30 is used between the carcass 20 and the tread layer 40. This is for example only and is not intended to be limiting on the invention. It is contemplated that the any type of bonding interface can be used between the tread layer 40 and the tire carcass 20; e.g., adhesives.

Figure 2:
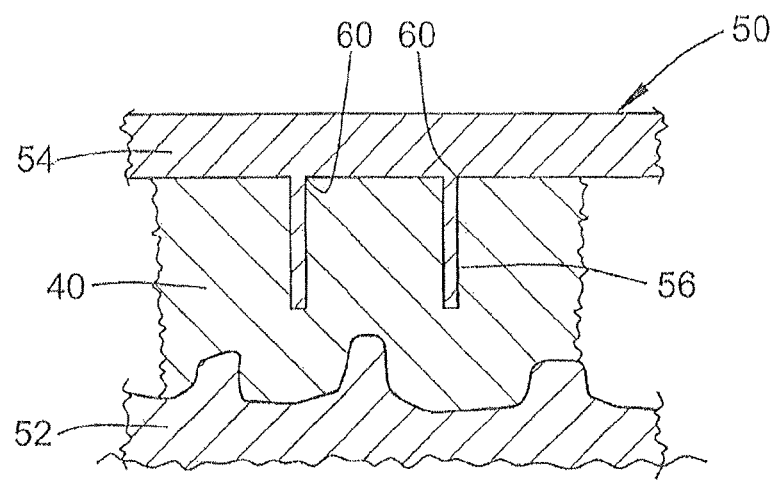
FIG. 2 shows a partial cross-sectional view of a tread layer mold for forming tread elements in the sole side of the tread layer.

The production of the tread layer 40 is shown in FIG. 2. Mold 50 has a tread impression side 52 for forming the tread pattern 42 in the outer surface 44 of the tread layer 40 and an interior side 54 for forming the sole side 46 of the tread layer 40. The interior side 54 comprises fins 56 for forming tread elements 48 in the sole side 46 of the tread layer 40.

Figure 3:
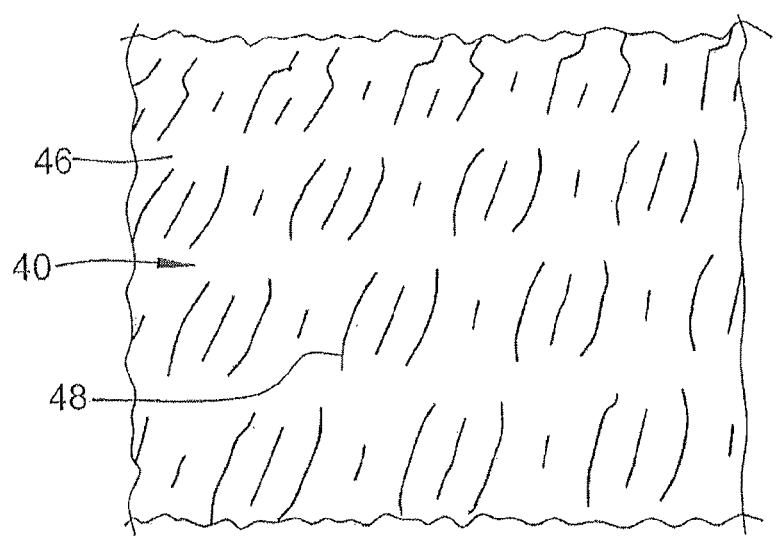
FIG. 3 shows a partial perspective view of a the sole side of the tread layer of FIG. 2 having a plurality of tread elements formed therein.

When the tread layer 40 is removed from the mold 50 as shown in FIG. 3, the tread elements 48 are visible in the sole side surface 46. Referring back to FIG. 2, it is noted that the fins 56 may be perpendicular to the sole side surface 46 and that sharp corners 60 are formed at the interface of the sole side surface 46 and the tread elements 48. The fins 56 may also be transverse to the sole side surface 46, however, sharp corners will still be formed. The terms "sharp corners" or "sharp edges" herein refers to a corner formed between two intersecting surfaces, wherein each surface extends about 0.2 mm or less from the projected intersection point of the surfaces or if the sharp corner exists as a radius, the radius is about 0.2 mm or less.

The sharp edges have a detrimental effect on the endurance of the retread tire 10. The sharp edge acts as a stress riser that provides an increase in stress concentration at the sharp edge which enables cracks to initiate along the bond interface of the cushion layer and the tread layer. In order to improve the endurance of the retreaded tire 10 the sole side of the tread layer and any sharp edges at the tread elements should be prevented or removed.

Figure 4:
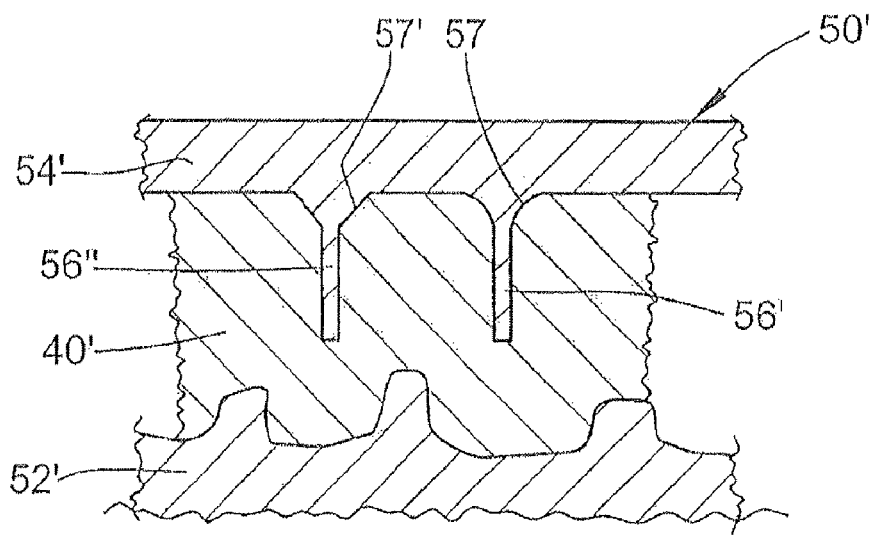
FIG. 4 shows a partial cross-sectional view of a tread layer mold for forming tread elements having rounded edges or chamfered edges in the sole side of the tread layer in accordance with an embodiment of the invention.

In one embodiment of the invention, as shown in FIG. 4, a mold 50' is used to form the tread elements 48' in a manner that no sharp edges are formed. Mold 50' comprises fins 56', 56" for forming tread elements 48' in the sole side 46' of the tread layer 40'. Fins 56' have a radius 57 formed at the interface of the fins 56' and the top or interior side 54' of the mold 50'. Fins 56" have a chamfer 57 formed at the interface of the fins 56" and the top or interior side 54' of the mold 50'. Accordingly, the edges of the tread element 48' are formed at a break edge or rounded edge when removed from the mold 50'.

Figure 5:
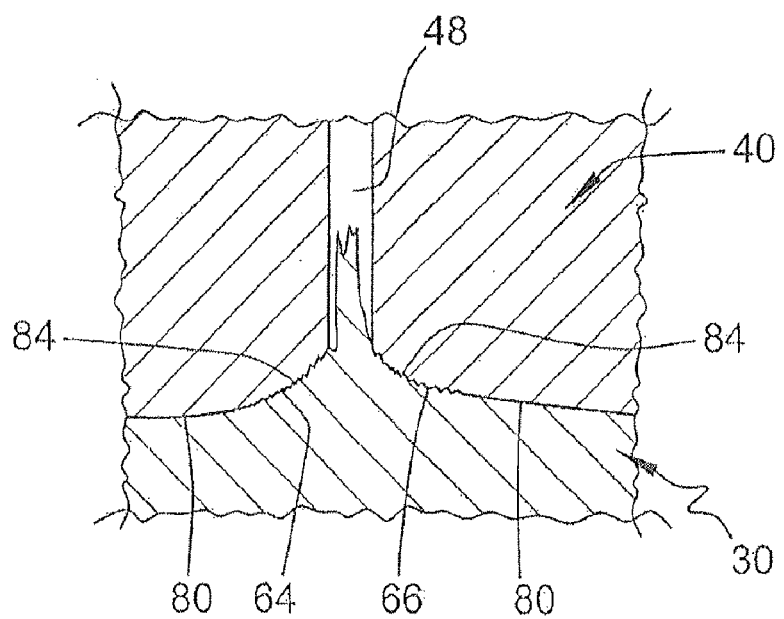
FIG. 5 shows a partial cross-sectional view of the tread layer/cushion layer interface of a retread tire having a break edge on the edges of the tread element.

Referring now to FIG. 5, a cross-sectional view of the tread layer/cushion layer interface of a retread tire is shown wherein the edges of the sole side of the tread layer 40 have been rounded. The terms "rounded edge", "broken edge", or "break edge" herein refers to a corner formed between two intersecting surfaces, wherein each surface ends 0.4 mm or more from the projected intersection point of the surfaces or if the break edge exist as a radius, the radius is 0.4 mm or larger. This minimum value is referred to as a "break edge of 0.4 mm." A bond boundary 80 is shown between the cushion layer 30 and the tread layer 40. At the boundary 80 it is shown that both the first edge 64 and the second edge 66 of the tread element 48 form a more rounded edge 84 with the cured cushion layer 30. The rounded edges 84 have been shown to significantly improve the endurance of the retread tire 10.

Figure 6:
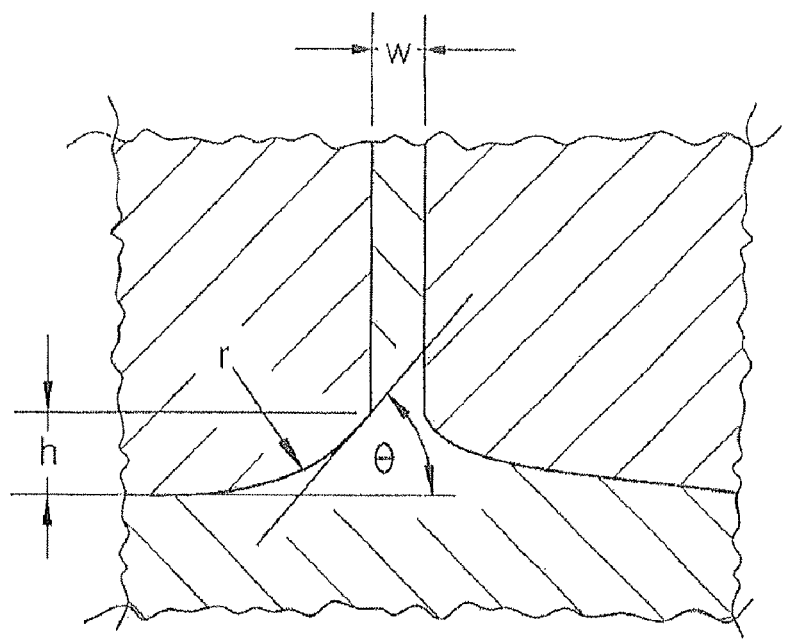
FIG. 6 shows a partial cross-sectional view of FIG. 5 further showing parameter limits of the edges.

If the rounding of the sharp edges is completed by molding, the edges will typically be in the form of a radius or in the form of a chamfer. Other methods of rounding the sharp edges may also be used such as cutting, ablation, abrasion, etc. It is likely that when using these other methods, the edges may be less uniform. For example, in an abrasion process, the edges are likely to be torn off during the process. In such a case, the propagation of the tear will be irregular as shown by the boundary 80 of FIG. 5. While the rounded corners have been previously described as a break edge, the applicant has conducted testing that can be used to better define the irregular surface using approximations to define the corner as a radius or as a chamfer or as combinations of the two. Referring now to FIG. 6, which is similar to FIG. 5, but now includes parameters related to the rounding of the sharp edges. The parameters shown are:

r: the radius of the rounded edge feature whether or not it is molded torn or cut h: the radial height between the surface of the sole side of the tread layer and end of the wall surface of the tread element θ: the angle of the material removed with respect to the surface of the sole side of the tread layer w: the width of the tread element The Applicant has conducted testing and found general guidelines for these parameters wherein the value of w is generally between 0.1 mm to 10 mm; the value of r is generally between 0.5 mm and 10 mm; the value of h is generally between 0.4 mm and 8 mm; and the angle of θ is generally between 5° and 85°. More particularly, the applicant has found that the endurance of the retread tire is longest when the parameters are within the following ranges: w is generally between 0.4 mm to 5 mm; the value of r is generally between 1 mm and 5 mm; the value of h is generally between 1 mm and 5 mm; and the angle of θ is generally between 15° and 55°.

Figure 7:
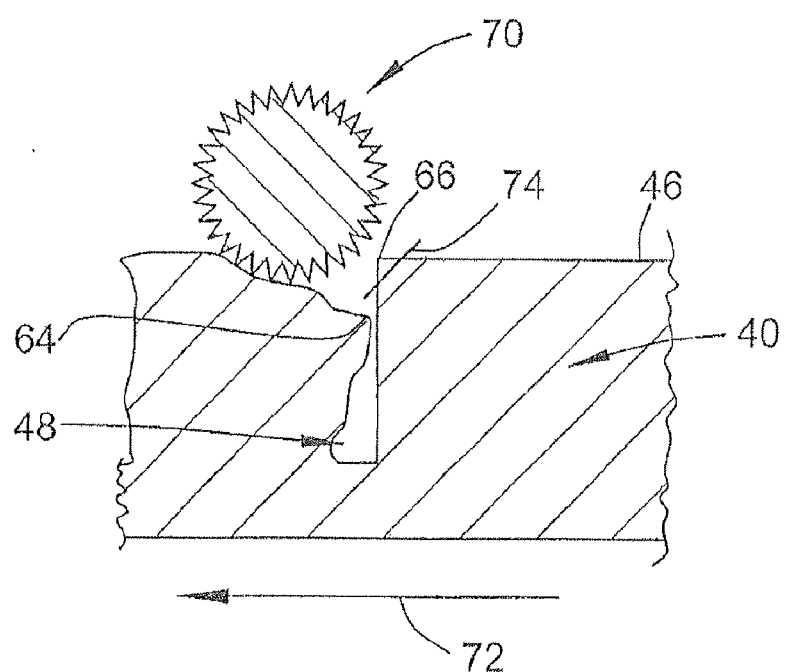
FIG. 7 shows a cross-sectional view of one embodiment for rounding at least one edge of the tread elements on the sole side of the tread layer.

Referring now to FIG. 7, another embodiment of the invention is shown for rounding the edges of the tread elements 48 on the sole side 46 of the tread layer 40. A rotating abrasion system 70 is shown which may include, for example, a grinding wheel or wire brush. The tread layer 40 moves in a single direction 72 past the fixed abrasion system 70. The abrasion system 70 rounds at least one of the first edge 64 and the second edge 66. As shown in FIG. 7, the first edge 64 of the tread element 48 pushes away from the abrasion system 70 whereas the second edge 66 of the tread element 48 is torn away (marked at element 74) from the tread layer 40 creating a break edge 84.

Figure 8:
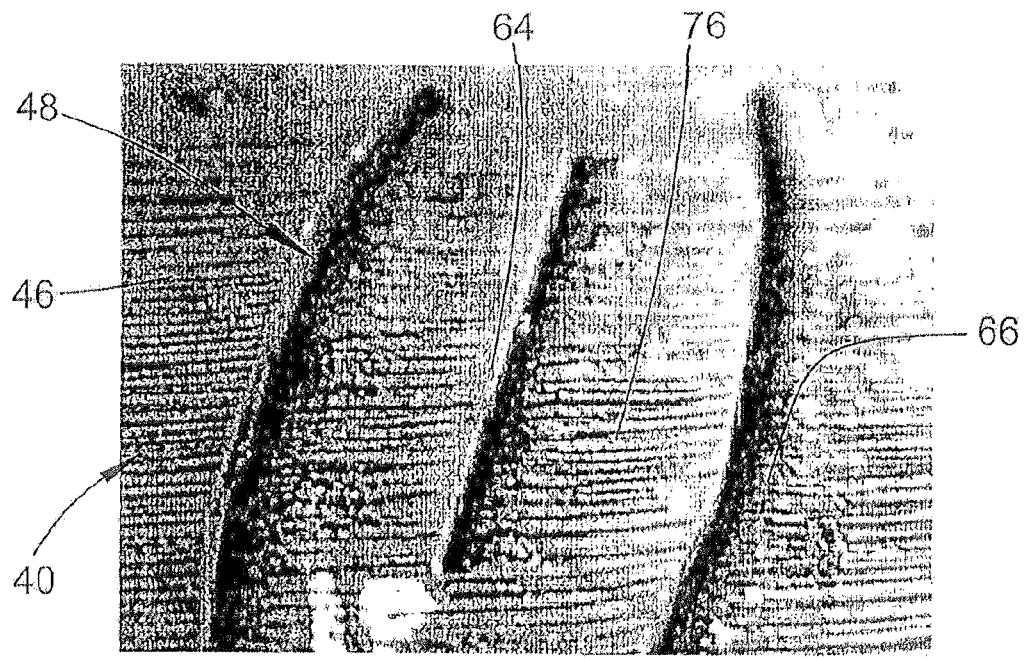
FIG. 8 shows a detail perspective view of the rounded edge formed on the tread elements of the sole side of the tread layer by the operation shown in FIG. 7.

This result is best shown in FIG. 8 which shows a detail perspective view of the abraded surface 76 formed adjacent the tread elements 48 of the sole side of the tread layer 40 by the abrasion system operation of FIG. 7. As shown in FIG. 8, the second edge 66 of the tread element 48 is abraded by the abrasion system 70 to form a break edge 84 whereas the first edge 64 of the tread element 48 is not abraded by the abrasion system 70 and remains as a sharp corner 82. It is also noted that the first edge 64 of the tread element 48 may still covered with mold release agent.

Figure 9:
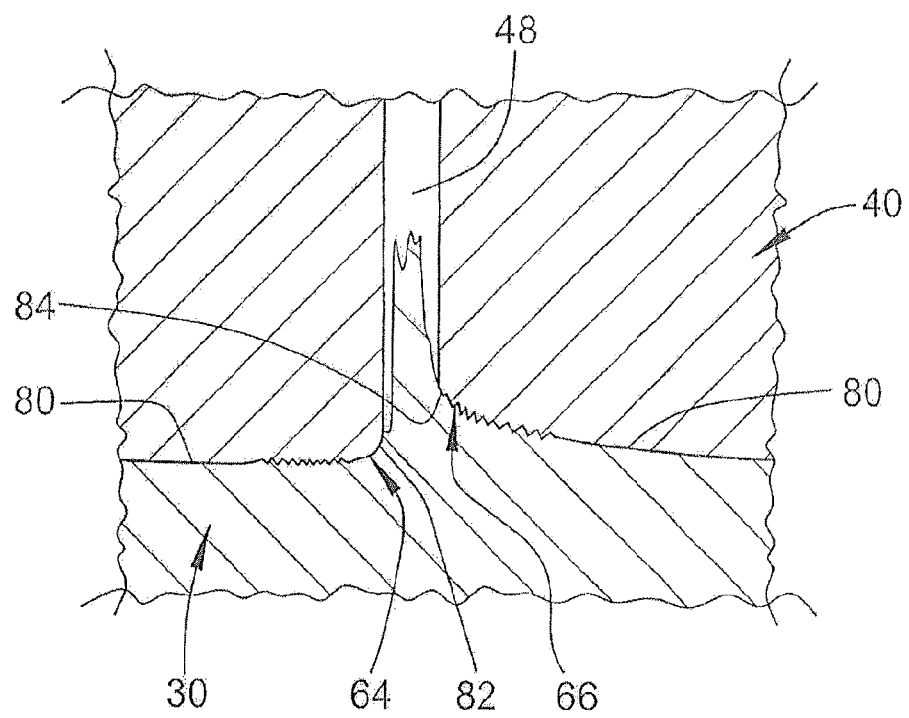
FIG. 9 shows a partial cross-sectional view of the tread layer/cushion layer interface of a retread tire having a break edge on one edge of the tread elements on the sole side of the tread layer.

Referring now to FIG. 9, a cross-sectional view of the tread layer/cushion layer interface of a retread tire is shown wherein the sole side of the tread layer 40 was formed by the abrasion system 70 process shown in FIG. 7. A bond boundary 80 is shown between the cushion layer 30 and the tread layer 40. At the boundary 80 it is shown that the first edge 64 of the tread element 48 forms a sharp edge 82 with the cured cushion layer 30. The second edge 66 of the tread element 48 forms a more rounded or broken edge 84 with the cured cushion layer 30.

Figure 10:
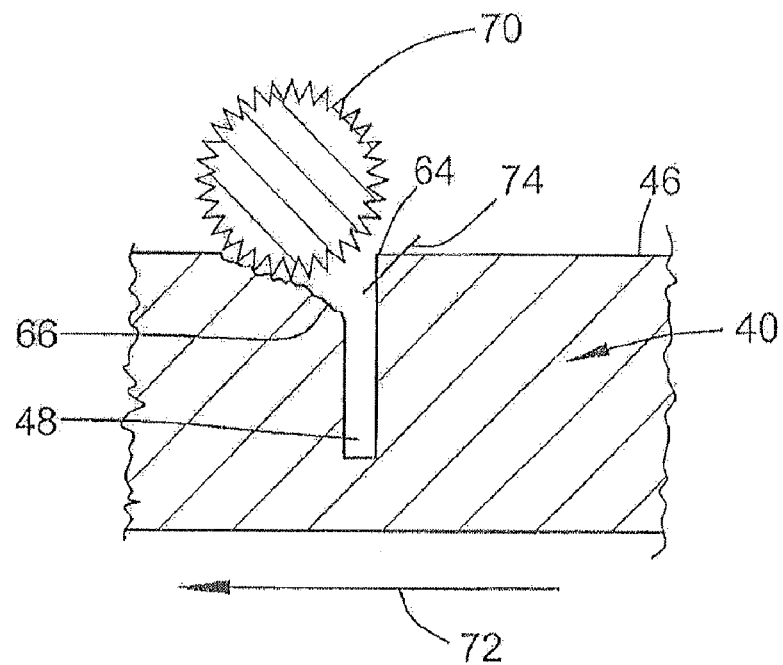
FIG. 10 shows a cross-sectional view of an embodiment for rounding both edges of the tread elements on the sole side of the tread layer.

Referring now to FIG. 10, another embodiment of the invention is shown for rounding the edges of the tread elements 48 on the sole side 46 of the tread layer 40. The rotating abrasion system 70 is now shown with the tread layer 40, as already processed as shown in FIGS. 7 and 8. The tread layer 40 is reversed such that it moves in a second effective direction 72 past the fixed abrasion system 70. The abrasion system 70 now rounds the second edge 66 creating a break edge 84.

Figure 11:
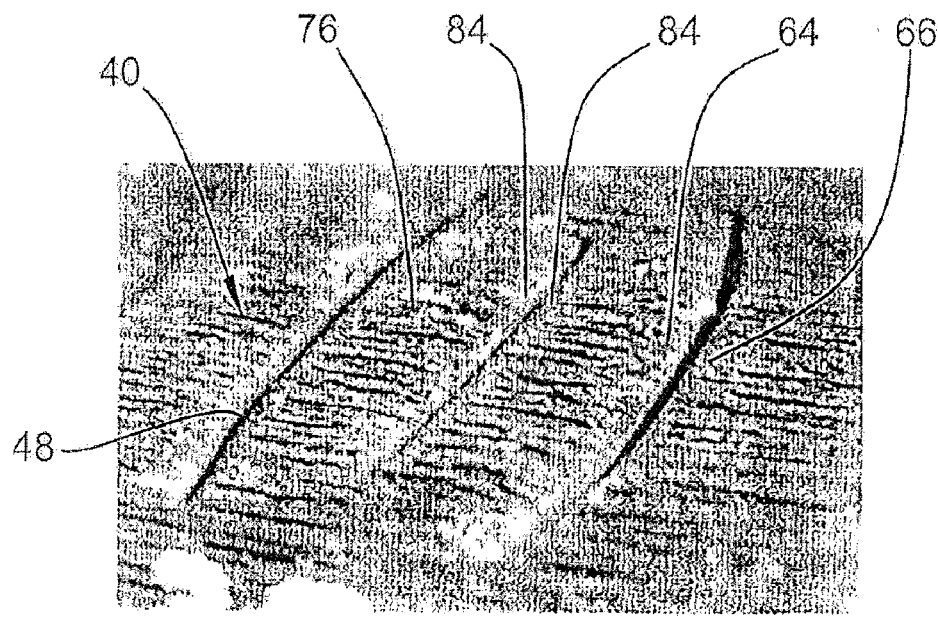
FIG. 11 shows a detail perspective view of the rounded edges formed on the tread elements of the sole side of the tread layer.

This result is best shown in FIG. 11 which shows a detail perspective view of the abraded surface 76 formed adjacent the tread elements 48 of the sole side of the tread layer 40 by the abrasion system operation of FIG. 10. As shown in FIG. 11, both the first edge 64 and the second edge 66 of the tread element 48 have been abraded by the abrasion system 70 to form a break edge 84 on each side of the tread element 48. It is further noted that the abraded surface 76 is roughened or textured by the abrasion system 70 which also helps create a stronger bond for the tread layer 40. The abrasion process modification to obtain this geometry is a function of the feed rate, vertical pressure, the tool used for the abrasion (for example, a wire brush or grinding stone) and material cohesion of the tread layer. With the use of the mold 50' to obtain rounded edges 84 for the tread elements 48 other texture processes may be appropriate such as, but not limited to, plasma blasting, sand blasting, carbon dioxide blasting, cutting, laser ablation, or water jet.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A tread for a retread tire comprising:
a tread body having a tread side adapted for engaging a ground surface and a sole side adapted for bonding with a tire carcass; and
a plurality of tread element voids formed in the sole side of the tread body and having at least a first edge and a second edge arranged on opposing sides of each tread element void of the plurality of tread element voids, each edge being located at an interface between the tread element void and a surface of the sole side of the tread; wherein at least one of the first edge and the second edge is a break edge, the break edge forming a corner between intersecting surfaces of the sole side and the tread element void, wherein each surface terminates 0.4 mm or more from the projected intersection point of the surfaces, where the break edge at least in part forms a chamfer.

2. The tread of claim 1, wherein the chamfer extends a height, h, from the sole side surface generally between 0.4 mm and 8 mm and at an angle, θ, from the sole side surface between 5° and 85°.

3. The tread of claim 1, wherein the chamfer extends a height, h, from the sole side surface generally between 1 mm and 5 mm and at an angle, θ, from the sole side surface between 15° and 55°.

4. The tread of claim 1, wherein both the first edge and the second edge have a break edge of at least 0.4 mm.

5. The tread of claim 4, wherein the second break edge at least in part forms a surface extending along a radius, r, generally between 0.5 mm and 10 mm.

6. The tread of claim 4, wherein the second break edge at least in part forms a chamfer extending a height, h, from the sole side surface generally between 0.4 mm and 8 mm and at an angle, θ, from the sole side surface between 5° and 85°.

7. The tread of claim 4, wherein the tread element has a cross-sectional width, w, of 0.4 mm to 5 mm and the second break edge at least in part forms a chamfer extending a height, h, from the sole side surface generally between 1 mm and 5 mm and at an angle, θ, from the sole side surface between 15° and 55°.

8. A retread tire comprising:
a tire carcass,
a tread body having a tread side adapted for engaging a ground surface and a sole side adapted for bonding with a tire carcass,
a plurality of tread element voids formed in the sole side of the tread body and having at least a first edge and a second edge arranged on opposing sides of each tread element void of the plurality of tread element voids, each edge being located at an interface between the tread element void and a surface of the sole side of the tread; wherein at least one of the first edge and the second edge is a break edge, the break edge forming a corner between intersecting surfaces of the sole side and the tread element void, wherein each surface terminates 0.4 mm or more from the protected intersection point of the surfaces, the break edge at least in part forms a chamfer;
a bonding interface bonding the sole side surface of the tread to the tire carcass.

9. The retread tire of claim 8, wherein the chamfer extends a height, h, from the sole side surface generally between 0.4 mm and 8 mm and at an angle, θ, from the sole side surface between 5° and 85°.

10. The retread tire of claim 8, wherein the chamfer having extends a height, h, from the sole side surface generally between 1 mm and 5 mm and at an angle, θ, from the sole side surface between 15° and 55°.

11. The retread tire of claim 8, wherein both the first edge and the second edge have a break edge of at least 0.4 mm.

12. The retread tire of claim 11, wherein the second break edge at least in part forms a surface extending along a radius, r, generally between 0.5 mm and 10 mm.

13. The retread tire of claim 11, wherein the second break edge at least in part forms a chamfer extending a height, h, from the sole side surface generally between 0.4 mm and 8 mm and at an angle, θ, from the sole side surface between 5° and 85°.

14. The retread tire of claim 11, wherein the second break edge at least in part forms a chamfer extending a height, h, from the sole side surface generally between 1 mm and 5 mm and at an angle, θ, from the sole side surface between 15° and 55°.

15. A method of retreading a tire comprising the steps of:
molding a tread body having a tread side adapted for engaging a ground surface and a sole side adapted for bonding with a tire carcass, wherein the surface of the sole side includes a plurality of tread element voids, each of the plurality of tread element voids having a first edge and a second edge at the interface of the tread element and the surface of the sole side of the tread body;
forming at least one of the first and second edges of each tread element to comprise a break edge, the break edge forming a corner between intersecting surfaces of the sole side and the tread element void, wherein each surface terminates 0.4 mm or more from the protected intersection point of the surfaces, the break edge at least in part forms a chamfer, the step of forming being accomplished by the step of:

molding at least one of the first edge and the second edge as a chamfer when the tread body is initially molded.

16. The method of claim 15, wherein the chamfer extends a height, h, from the sole side surface generally between 0.4 mm and 8 mm and at an angle, θ, from the sole side surface between 5° and 85°.

17. The method of claim 15, wherein the chamfer extends a height, h, from the sole side surface generally between 1 mm and 5 mm and at an angle, θ, from the sole side surface between 15° and 55°.

18. A method of retreading a tire comprising the steps of:
molding a tread body having a tread side adapted for engaging a ground surface and a sole side adapted for bonding with a tire carcass, wherein the surface of the sole side includes a plurality of tread element voids, each of the plurality of tread element voids having a first edge and a second edge at the interface of the tread element and the surface of the sole side of the tread body;
forming at least one of the first and second edges of each tread element to have a break edge of 0.4 mm or more, wherein the step of forming is accomplished by the step of:
cutting at least one of the first edge and the second edge.

19. The method of claim 18, wherein the step of forming at least one of the first and second edges of each tread element to have a break edge of 0.4 mm or more is accomplished by the step of:
cutting both the first edge and the second edge.

20. A method of retreading a tire comprising the steps of:
molding a tread body having a tread side adapted for engaging a ground surface and a sole side adapted for bonding with a tire carcass, wherein the surface of the sole side includes a plurality of tread element voids, each of the plurality of tread element voids having a first edge and a second edge at the interface of the tread element and the surface of the sole side of the tread body;
forming at least one of the first and second edges of each tread element to have a break edge of 0.4 mm or more, wherein the step of forming is accomplished by the step of:
abrading at least one of the first edge and the second edge.

21. The method of claim 20, wherein the step of forming at least one of the first and second edges of each tread element to have a break edge of 0.4 mm or more is accomplished by the step of:
abrading both the first edge and the second edge.

* * * * *

UNITED STATES PATENT AND TRADEMARK OFFICE
CERTIFICATE OF CORRECTION

PATENT NO. : 8,267,134 B2  
APPLICATION NO. : 12/440936  
DATED : September 18, 2012  
INVENTOR(S) : Paul A. Mayni et al.

Page 1 of 1

It is certified that error appears in the above-identified patent and that said Letters Patent is hereby corrected as shown below:

IN THE CLAIMS:

In Column 6, line 27 (claim 8) delete "protected" and insert -- projected --.

In Column 6, line 36-37 (claim 10) delete "chamfer having extends" and insert -- chamfer extends --.

In Column 6, line 67 (claim 15) delete "protected" and insert -- projected --.

Signed and Sealed this  
Thirtieth Day of April, 2013

Teresa Stanek Rea  
*Acting Director of the United States Patent and Trademark Office*